United States Patent

[11] 3,607,298

| [72] | Inventors | William Mitchell<br>Hatfield, England;<br>Robert O. V. Lloyd, Sandyford, Ireland |
| --- | --- | --- |
| [21] | Appl. No. | 629,905 |
| [22] | Filed | Apr. 11, 1967 |
| [45] | Patented | Sept. 21, 1971 |
| [73] | Assignee | Bush Boake Allen Limited<br>London, England |
| [32] | Priority | Apr. 14, 1966, Sept. 16, 1963 |
| [33] | | Great Britain |
| [31] | | 16437/66 and 36382/63 |
| | | Continuation-in-part of application Ser. No. 359,788, Aug. 14, 1964, now abandoned. |

[54] HOP CONCENTRATES
33 Claims, No Drawings

| [52] | U.S. Cl. | 99/50.5 |
| --- | --- | --- |
| [51] | Int. Cl. | C12c 9/02 |
| [50] | Field of Search | 99/50.5, 50 |

[56] References Cited
UNITED STATES PATENTS

| 2,562,934 | 8/1951 | Michener et al. | 99/50.5 X |
| --- | --- | --- | --- |
| 2,898,209 | 8/1959 | Murtaugh et al. | 99/50.5 |
| 3,044,879 | 7/1962 | Koch et al. | 99/50.5 |
| 3,155,522 | 11/1964 | Hildebrand et al. | 99/50.5 |
| 3,364,265 | 1/1968 | Klingel et al. | 99/50.5 X |

FOREIGN PATENTS

| 619,563 | 4/1961 | Canada | 99/50.5 X |
| --- | --- | --- | --- |

*Primary Examiner*—Lionel M. Shapiro
*Attorney*—Herbert H. Goodman

ABSTRACT: Hop extract free of fixed hop seed oil is prepared by treating hop and hop extracts with ethanol or methanol and 5-20 percent water. The hop extract may be isomerized. A brewing adjunct containing substantially no fixed hop seed oil and containing humulones or isohumulones emulsifying agents stabilizers and sugars is disclosed.

HOP CONCENTRATES

The present application is a continuation-in-part application of application Ser. No. 359,788 filed Aug. 14, 1964, now abandoned.

The present invention relates to hop extracts, including isomerized hop extracts and to processes for their production.

Hops contain, among other things: soft and hard resins including such weakly acidic compounds as humulones (e.g. humulone, cohumulone and adhumulone) and lupulones; essential oils which are those relatively volatile oils which contribute to the characteristic odor of hops; fixed oils, which are contained in the hop seeds and are not readily distilled or extracted by hot water; and water-soluble material such as tannins and proteins.

In the traditional brewing process hops are boiled with wort, which is an aqueous solution of malt sugars. As a consequence of the boiling, a variety of resins and oils pass into the wort. Of these the most important are the humulones, which on boiling are partially isomerized to form water-soluble isohumulones. It is believed that the isohumulones are the principle bittering agent present in the finished beer, but a very large number of other compounds of widely differing chemical nature are also present in traditional beer and contribute to its properties. In the traditional process only a small proportion of the humulones present in the hops are isomerized and taken into solution. Further disadvantages of the traditional method are the need to store a large bulk of hops, which are liable to deteriorate, and the variability of flavor between batches.

The extraction of hops by solvents to give hop extracts which can be used to replace or augment hops in the brewing of beers and ales has received considerable attention for many years. This problem has attracted increased attention during the last 10 years because of the development in the chemistry of hop constituents and because the brewing industry has become rather less conservative in its attitude toward changes in materials and methods.

There are five main attractions to the successful use of solvent extracts of hops. These can be summed up as follows:

1. Hops vary widely in their content of humulones which are now considered to be the principal substance of brewing interest in the hop. Variation due to the sampling and to age of the hop and to varietal factors effect the humulone content whereas an extract can be made virtually homogeneous, thus removing sampling error. It thus enables the brewer to specify with certainty the amount of humulones he is going to use in brewing.
2. The use of a solvent extract of hops results in a considerable saving in storage space since the extract occupies very little space as compared with the amount of actual hops which would be required to furnish the same quantity of active constituents. In addition it is necessary to store hops at a reduced temperature in order to minimize their deterioration; and in any case hops only have a limited storage life, whereas a hop extract is stable.
3. When using a solvent extract of hops there is an improved utilization of the humulones contained in the extract as compared with humulones contained in hops themselves. The conversion of humulones into isohumulones in the production of beer from actual hops is rarely higher than 30 percent whereas higher conversions can be obtained using a solvent extract of hops.
4. Solvent extracts of hops can be stored for long periods, thus insulating the brewer from the large price fluctuations and supply difficulties which occur due to the varying yields of hops from year to year.
5. THe disposal of "spent hops" is a continuing problem in the brewing industry and the use of a solvent extract of hops overcomes this difficulty, at least so far as the brewer is concerned.

It has therefore been proposed to increase the utilization of humulones by contacting the hops with an organic extracting solvent, thereby extracting as much as possible of the humulones and other resins and oils. It has been found that extracts prepared in this way have a disagreeable flavor which makes beer unpalatable, especially when the latter is pasteurized in the bottle. Furthermore, when such extracts are added to wort and boiled, only a small proportion of the humulones are converted into isohumulones. To overcome the latter drawback it has also been proposed to isomerize humulones by boiling with alkali. This effectively isomerizes the humulones but causes deterioration of some other ingredients commonly present in the hops or hop extract.

Processes have been proposed whereby the extract may be separated into its various components, enabling the humulones to be obtained free of other hop ingredients and isomerized separately, but the pure isohumulones have a harsh flavor, and none of the other hop components provides a natural beer flavor on its own. Moreover the cost of effecting such separations outweighs the economic advantage of increased utilization of the hop ingredients.

It is an object of the present invention to provide an improved utilization of the humulone content of hops without, at the same time, giving the beer undesirable flavor characteristics, for example when pasteurized. A further object of the invention is to provide an extract which can be used to prepare beer whose flavor corresponds closely to that prepared by the traditional process. A still further object of the present invention is to provide isomerized extracts which do not possess the off flavors normally produced when hops are contacted with boiling alkali.

We have discovered that, under the rigorous extracting conditions necessary to separate the majority of the humulones and other desirable ingredients from the matrix of insoluble cellulosic material, certain undesirable materials are extracted as well. The latter include a part of the fixed oils of the hop seeds. We have further discovered that such crude solvent extracts may be purified by contacting with a solvent which dissolves the humulones and other desirable materials, but in which the fixed oils are relatively insoluble. In particular, we have discovered that 80–95 percent aqueous lower alcohol, such as methanol or ethanol, may be used to purify crude hop extracts to give a more natural flavor.

We have also discovered that purified hop extracts may be conveniently isomerized with hot aqueous alkali without developing an unpleasant flavor, providing the essential hop oils are first removed. We have found that this can be achieved by contacting a solution of the extract in a water-immiscible solvent with an aqueous alkali, whereupon the humulones, together with certain other desirable acidic ingredients, pass into the aqueous phase while the essential oils remain in the organic phase.

If, on the other hand, isomerization of the humulones with hot alkali is performed prior to the separation of the fixed oils, we have found that the isomerized crude extract can be freed from substances producing off flavors by contacting it with 80–85 percent aqueous methanol at a pH between 2 and 7.

Our invention, therefore, provides inter alia a solvent extract of hops containing humulones together with other hop ingredients which are soluble in organic extracting solvents, but which is substantially free of fixed hop seed oil.

Our invention further provides, in the process for preparing a solvent extract of hops wherein hops are contacted with an extracting solvent to form a solution of a crude extract and the solution is separated from insoluble matter, the improvement which comprises: contacting the said crude extract with a purifying solvent which dissolves the humulones but not the fixed oils to form a solution of a purified extract; separating the undissolved fixed oils from the solution; and recovering the purified extract.

According to a preferred embodiment our invention provides a method of purifying a crude solvent extract of hops which comprises; contacting the said crude extract with an organic solvent consisting essentially of from 0–95 percent by volume of methanol, from 0–95 percent by volume ethanol and from 5–20 percent of water in an amount sufficient to dissolve a part of the crude extract, thereby forming a solution of the purified extract; seperating the solution of the purified extract from the undissolved part of the crude extract; and recovering the purified extract.

The invention also provides a method of isomerizing hop extracts which comprises seperating the essential oils from the acidic components of the extract and boiling the latter with aqueous alkali.

Our invention further provides a method of isomerizing a solvent extract of hops which comprises contacting a solution of the extract in a water-immiscible solvent with aqueous alkali, seperating the aqueous phase from the nonaqueous phase, boiling the aqueous phase and recovering the isomerized extract.

A further aspect of our invention provides a method of purifying an isomerized crude extract of hops which comprises: contacting the said isomerized crude extract with sufficient acid to bring the pH of the extract to a volume of from 1–7 and with sufficient of a solvent consisting of 80–85 percent methanol and 15–20 percent water to dissolve a part of the extract; operating the solution from the undissolved matter and recovering the dissolved portion of the extract.

Crude extracts for use in our invention may be conveniently prepared by methods known to the art. Preferably the hops are contacted with an excess of an organic solvent. The preferred solvents for use in preparing the crude extract are hydrocarbons such as light petroleum and especially benzene. Other solvents which may be used include acetone, absolute methanol and carbon tetrachloride. The hops may conveniently be ground, for example in a high-speed hammermill and slurried with excess of the solvent, preferably at ambient temperature, and the insoluble material is then removed by centrifuging or filtration. Alternatively the solvent may be percolated through the ground hops. The solvent may then be evaporated off to leave the crude extract.

The solvent which we prefer to use, according to our invention, for the purification of the crude extract is aqueous methanol containing from 80 to 90 percent methanol and 10 to 20 percent water.

The crude extract may be recovered and then contacted, preferably at room temperature, with sufficient aqueous alcohol to dissolve the more readily soluble portion. The insoluble or sparingly soluble portion is then separated, for example by centrifuging, and washed with a small portion of aqueous alcohol, which is added to the main bulk of the solution. The solvent is then evaporated. Alternatively the crude extract may be dissolved in just sufficient absolute alcohol to dissolve the extract, and the solution diluted with 5 to 20 percent water. For example the hops may be initially extracted with absolute methanol, and solution of crude extract concentrated to saturation and 5 to 20 percent by volume of water added.

Using the former method to purify benzene extracts of good quality hops, we have obtained extracts containing from 82 to 94 percent of soft resins, including a total humulones content of from 25 to 55 percent, a total lupulones content of from 10 to 40 percent, from 1 to 4 percent of essential oil of hops, up to 2 percent of water and the balance of other resinous material soluble in aqueous methanol.

It has further been found that the purified extracts of hops produced as described above, although they can be successfully used in brewing are greatly improved if they are converted, prior to packing, into a dispersible form. This can be one blending the warm extract with a commercially available emulsifying agent and an emulsion stabilizing agent together with brewing sugars. The material produced is viscous but when warmed and mixed with a moderate volume of hot water yields a cream which is relatively stable and which when added to boiling wort provides intimate contact between the hop resins and the boiling wort. In this way a more efficient utilization of the humulones is obtained. A suitable emulsifying agent is methyl ethyl cellulose, a suitable stabilizing agent is sodium carboxymethyl cellulose and glucose syrup can be used as the brewing sugar.

It has been found that a suitable dispersion can be obtained by adding to 100 parts by weight of the purified hop extract a mixture of 2.5 parts by weight of 5 percent aqueous methyl ethyl cellulose solution, 2.5 parts by weight of a 5 percent aqueous sodium carboxymethyl cellulose solution and 2.5 parts by weight of glucose syrup (70 percent glucose w/v in water). However, it is possible to add as much as 50 parts by weight of the 5 percent aqueous solutions of the emulsifying agent and the stabilizing agent for each 100 parts by weight of hop extract and there is no upper limit to the quantity of brewing sugar which may be added.

The preferred water-immiscible solvents for use in the preparation of an isomerized extract according to the invention are hydrocarbons and chlorinated hydrocarbons for example benzene, light petroleum and carbon tetrachloride. The concentrate may be dissolved in the water-immiscible solvent, and the solution is preferably separated from any insoluble matter by filtration or centrifuging. The solution is then contacted with aqueous alkali, employing vigorous agitation. The phases are separated, the aqueous phase being filtered or centrifuged, and then heated to distil off any residual organic solvent, and to isomerize the humulones.

The preferred alkali for use in the isomerization precess is potassium hydroxide but sodium hydroxide can also be used. The concentration of the alkali used is not critical but a preferred concentration is from 2 to 20 percent w/v; a concentration of 10 percent w/v has been found to be advantageous.

It is preferred to use just sufficient of the alkali to bring the pH of the solution at the alkaline extraction stage to within the range of 10.7 to 12.0, advantageously 10.7 to 11.0.

In a modification of the isomerization process, sodium or potassium hydroxide is used as the alkali but carbon dioxide gas is passed through the alkaline solution during the distillation which converts the sodium or potassium hydroxide to the corresponding carbonate and maintains an inert atmosphere during isomerization.

Preferred conditions for distillation and isomerization are the use of atmospheric pressure and distillation times of at least 1 hour.

The organic solvent solution which is separated out may contain hop seed oil, essential oil of hops and other materials which may have been present in the concentrate and the organic solvent solution can be worked up to recover them.

The alkaline solution containing the isohumulones can be added to an unhopped or lightly hopped beer to bring the isohumulones up to the desired level and to obtain the requisite bitterness. Alternatively it may be further concentrated by distillation under reduced pressure to obtain a viscous extract. If preferred, the drying can be continued to give a dry solid residue which can be powdered and is greenish yellow to golden in color. This dry powder is hygroscopic, and should be stored in sealed containers.

The alkaline solution of isohumulones, or concentrates obtained from it (dispersed in water to give solutions which may be turpid) can readily be dispersed into beer. The conversion into isohumulones based on the humulones content of the original concentrate may reach a figure of 80 percent or better.

The above-described isomerization may be performed after crude extract has been purified to remove fixed oils in accordance with our invention. Where the isomerization is carried out directly on a crude extract it is desirable to separate any fixed oil from the isomerized crude extract. In this instance it is desirable to contact the hops with a water-immiscible organic extracting solvent to form a solution of crude extract, separate the solution from insoluble matter, contact the solution with aqueous alkali, separate the aqueous phase from the organic phase, heat the aqueous phase, recover an isomerized extract from the aqueous phase, contact the isomerized extract with sufficient acid to bring the pH to a value to 2 to 7 and sufficient 80 to 85 percent aqueous methanol to dissolve a part of the neutralized extract, separate the undissolved part and recover the dissolved part. It is desirable to add alkali to an extract so purified, in order to form a stable extract containing sodium isohumulates.

The impure isomerized extract is contacted with the 80 to 85 percent aqueous methanol and acid, preferably hydrochloric acid. The purification may be carried out by contacting the impure extract with just sufficient absolute methanol to dissolve the extract, and then adding hydrochloric acid, to bring the pH from 7 to 2. Finally additional water is added to bring the water content to from 15 to 20 percent.

The product may be centrifuged and the insoluble residue washed with 80 to 85 percent aqueous methanol. The washings may be added to the bulk of the solution and the methanol removed by distillation. It is preferred to add sufficient alkali to the product to bring the pH to a value of from 10 to 12 and preferably 10.5.

The processes described herein is of particular value for extracting oast-dried hops; they may also be employed in extracting vine fresh or freeze-dried hops.

The invention is illustrated by the following examples relating to oasted hops:

Example 1

One hundred pounds of a crude hop extract made by extracting hops with benzene in a solvent: hop ratio of 5:1 and a temperature of from 20° to 25° C. and removing the solvent from the extract, is run slowly into 50 gallons of 90 percent by volume aqueous methanol with continuous and vigorous mechanical agitation. Agitation is continued for 30 minutes after the completion of the addition. This stage of the process is carried out at a temperature of about 20° C. The mixture is then passed through a separating centrifuge. The heavy dark-colored, oily residue is reextracted with a further quantity of 10 gallons of 90 percent by volume methanol once again with continued mechanical stirring for 15 minutes, and this material is also separated in a centrifuge. This reextraction of the solid residue is repeated a sufficient number of times, usually three, to secure complete extraction of the active constituents, after which the solid residue is discarded. The original methanol extract is combined with the various wash liquors, the solvent removed by distillation, the last traces being removed under vacuum, and the residue of the desired, purified hop extract weighted 63 lbs.

Example 2

The process described in example 1 was repeated with a further 100 lbs. of hop extract except that 90 percent by volume aqueous ethanol was used in place of the 90 percent by volume methanol and the separations of the phases were effected by gravity on standing instead of using a centrifuge. The product was a purified hop extract very similar to that obtained by the process of example 1, and weighed 72 lbs.

The solvent used in example 1 and example 2 can be replaced by 90 percent by volume aqueous industrial methylated spirit to obtain a purified hop extract of similar quality.

Example 3

Hop concentrate, purified as described in example 1 above, (100 lbs.) was dissolved in benzene (30 gals.). The resultant solution was agitated with a 10 percent weight by volume aqueous solution of potassium hydroxide sufficient to obtain a pH of 11.0 in the aqueous layer after separation. The volume of alkali solution required varies with the particular hop concentrate used, but in the example, was of the order of 12.5 gals. After settling for several hours, the aqueous layer was run off and washed with benzene (5 gals.). The original benzene solution was reextracted with water (1 gal.), which was in turn run off and washed with the secondary benzene extract. The aqueous solutions were united and boiled at atmospheric pressure for 1 hour to remove dissolved solvent and to effect isomerization. The solution was then concentrated under reduced pressure to give 100 lbs. of a viscous extract, further drying of this yielded 80 lbs. of a dried product which could be powdered.

Example 4

One hundred pounds of a crude 11 extract made by extracting hops with light petroleum (boiling point 75° to 95° C.). In a solvent: hop ratio of 5:1 at a temperature of from 20° to 25° C. and removing the solvent from the extract, is run slowly into 50 gals. of 95 percent by volume aqueous methanol with continuous and vigorous mechanical agitation. Agitation is continued for 30 minutes after the completion of the addition. This stage of the process is carried out at a temperature of about 20° C.

The mixture is then passed through a separating centrifuge. The heavy-colored, oily residue is reextracted with a further quantity of 10 gals. of 90 percent by volume aqueous methanol, once again with continued agitation for 15 minutes, and this material is also separated in the centrifuge. This reextraction of the solid residue is repeated a sufficient number of times, usually three, to secure complete extraction of the active constituent, after which the solid residue is discarded. The original methanol extract is combined with the various wash liquors, the solvent removed by distillation, the last traces being removed under vacuum, and the residue of the desired, purified hop extract is weighed and produces a yield of 68 lbs. of product.

Example 5

One hundred pounds of a crude hop extract made by extracting hops with benzene, in a solvent: hop ratio of 5:1 and a temperature of from 20° to 25° C. was agitated with a 10 percent weight by volume aqueous solution of potassium hydroxide sufficient to obtain a pH of 11.0 in the aqueous layer after separation. The volume of alkali solution required varies with the particular hop concentrate used, but in the example, was of the order 12.5 gals. After settling for several hours, the aqueous layer was run off and washed with benzene (5 gals.). The original benzene solution was reextracted with water (1 gal.), which was in turn run off and washed with the secondary benzene extract. The aqueous solutions were united and boiled at atmospheric pressure for 1 hour to remove dissolved solvent and to effect isomerization. The solution was then concentrated under reduced pressure to give 100 lbs. of a viscous extract. The resultant isomerized viscous extract (moisture content 16 percent), which weighed 60 lbs., was dissolved in 20 gals. of pure methanol, 2½ gals. of 4N, aqueous hydrochloric acid and 1½ gals. of water were added with stirring, so that the overall content of methanol in the solvent mixture was 80 percent volume by volume. The mixture was centrifuged and the clear supernatent liquid (pH 3.2) separated. The residue was washed with three successive portions, each of 2½ gals., of 80 percent by volume methanol, separating by centrifuging each time. The united methanolic extracts were distilled to remove the methanol, cooled, and 5 gals. of 2N aqueous potassium hydroxide was added. Evaporation of the solution yielded 50 lbs. of dry solid that could readily be powdered.

Example 6

The procedure was as in example 5, except that the unpurified isomerized extract was dissolved in 20 gals. of pure methanol, 3 gals. of 4N aqueous hydrochloric acid and 2 gals. distilled water were then added successively. The pH of this mixture was 2.0, and the final volume of 2N aqueous potassium hydroxide used was 6 gals. The yield of purified isomerized product was 51 lbs.

We Claim:

1. A solvent extract of hops, containing humulones together with hard and soft resins and essential oils which are soluble in organic extracting solvents, which is substantially free from fixed hop seed oil.

2. Extract according to claim 1 containing hop resins which is fully soluble in 90 percent aqueous methanol at 20° C. to an extent of at least 63 lbs. in 8 gallons.

3. A process for preparing a purified solvent extract of hops comprising contacting hops with an extracting solvent to form a solution of a crude extract of hops containing insoluble matter, humulones, essential oils and fixed hop seed oil, separating said insoluble matter from said solution; and removing said extracting solvent to obtain a crude extract; contacting said crude extract with a purifying solvent consisting essentially of at least one alcohol selected from the group consisting of methanol and ethanol in an amount from 0–95 percent by volume of methanol and from 0–95 percent by volume of ethanol, and from 5–20 by volume of water, in an amount sufficient to dissolve a part of the crude extract thereby forming a solution of a purified extract containing humulones and essential oils and being substantially free of fixed hop seed oil; separating the solution of the purified extract from the undissolved part of the crude extract; and recovering the purified extract.

4. A process according to claim 3 wherein the extracting solvent is selected from benzene and light petroleum.

5. A process according to claim 3 wherein the crude extract is dissolved in the purifying solvent at a temperature of 0° to 25°C.

6. A process according to claim 5 wherein the crude extract is contacted with the purifying solvent at ambient temperature.

7. A process according to claim 6 wherein the purifying solvent consists of from 80 to 90 percent by volume methanol and from 10 percent to 20 percent by volume of water.

8. A process according to claim 7 wherein the crude extract is first dissolved in absolute methanol and the water added subsequently.

9. A process according to claim 8 wherein the hops are extracted with absolute methanol to form the solution of crude extract, the solution of crude extract is concentrated to saturation and 10 to 20 percent volume water added to the solution.

10. A method according to claim 3 wherein a solution of said purified extract in a water-immiscible solvent is contacted with sufficient aqueous alkali to extract the acidic resins into the aqueous phase, separating the aqueous phase from the nonaqueous phase, boiling the aqueous phase to isomerize the humulones and recovering the isomerized extract which is substantially free of fixed hop seed oil and essential oils.

11. A process according to claim 10 wherein the water-immiscible solvent is selected from hydrocarbons and halogenated hydrocarbons.

12. A process according to claim 11 wherein the water-immiscible solvent is benzene.

13. A process according to claim 10 wherein the aqueous alkali is selected from aqueous sodium hydroxide and aqueous potassium hydroxide.

14. A process according to claim 13 wherein the concentration of the alkali is from 2 to 20 percent weight by volume.

15. A process according to claim 10 wherein the pH of the alkaline solution is from 10.7 to 12.

16. A process according to claim 13 wherein the pH of the alkaline solution is from 10.7 to 11.

17. A process according to claim 13 wherein carbon dioxide is passed through the solution of the alkaline extract.

18. A process according to claim 10 wherein the solution of the alkaline extract is boiled at atmospheric pressure for at least 1 hour.

19. A process according to claim 10 wherein the solution of the isomerized extract is concentrated by removal of at least a part of the water.

20. An extract of hops according to claim 1 which comprises from 82 to 94 percent of soft resins, including a total humulones content of from 25 to 55 percent, a total lupulone content of from 10 to 40 percent, from 1 to 4 percent essential oil of hops, up to 2 percent of water the residue consisting of resinous material soluble in 80 to 95 percent aqueous methanol at 0° to 50°C.

21. A process for preparing an isohumulone-containing extract of hops which comprises: contacting hops with a water-immiscible organic solvent to form a solution of a crude extract containing humulones, essential oils and fixed hop seed oil, separating the solution from insoluble matter, contacting the solution with aqueous alkali, separating the aqueous phase containing the humulones and a portion of the fixed hop seed oil, from the organic phase containing the essential oils, heating the aqueous phase to isomerize the humulone content thereof, recovering the isomerized extract from the aqueous phase, contacting the isomerized extract with sufficient acid to bring the pH of the extract to a value of from 2 to 7 and with sufficient of a solvent consisting of 80 to 85 percent methanol and 15 to 20 percent water to dissolve a part of the neutralized extract, separating the solution from the undissolved matter and recovering the dissolved portion of the extract substantially free of fixed hop seed oil.

22. A process according to claim 21 wherein the water-immiscible solvent is selected from hydrocarbons and halogenated hydrocarbons.

23. A process according to claim 22 wherein the water-immiscible solvent is benzene.

24. A process according to claim 21 wherein the hops are contacted with the water-immiscible solvent at ambient temperature.

25. A process according to claim 21 wherein the acid is hydrochloric acid.

26. A process according to claim 21 wherein the isomerized extract is finally made alkaline.

27. A process according to claim 26 wherein the final pH of the isomerized extract is at least 10.5.

28. A process according to claim 21 wherein the aqueous alkali is selected from sodium hydroxide and potassium hydroxide.

29. A process according to claim 28 wherein the concentration of the alkali is 2 to 20 percent weight by volume.

30. A process according to claim 21 wherein the pH of the aqueous phase after contacting with the water-immiscible solvent is from 10.7 to 12.

31. A process according to claim 30 wherein the pH of the aqueous phase after contacting the water-immiscible solvent is from 10.7 to 11.

32. A process according to claim 26 wherein the crude isomerized extract is contacted with sufficient absolute methanol to dissolve the extract and subsequently the pH is adjusted to a value of from 2 to 7 by addition of hydrochloric acid, and finally water is added to bring the water content to a value of from 15 to 20 percent by volume.

33. A brewing adjunct containing substantially no fixed hop seed oil consisting essentially of (A) at least one compound selected from humulones isohumulones and alkali metal salts thereof (B) at least one other hop ingredient selected from hop resins and essential oils and (C) at least one compound selected from emulsifying agents, emulsion stabilizers and brewing sugars.

UNITED STATES PATENT OFFICE
CERTIFICATE OF CORRECTION

Patent No. 3,607,298  Dated September 21, 1971

Inventor(s) WILLIAM MITCHELL and ROBERT O.V. LLOYD

It is certified that error appears in the above-identified patent and that said Letters Patent are hereby corrected as shown below:

Left column, page 1, in connection with the priority information, the column should be amended to read:

[32] Priority Apr.14, 1966, Sept.16, 1963, Apr. 18, 1963
[33] Great Britain
[31] 16437/66 and 36382/63 and 15363/63
Continuation-in-part of application Ser. No. 359,788, April 14, 1964, now abandoned.

Column 1, line 3, replace "Aug." with -- April --.

Signed and sealed this 18th day of July 1972.

(SEAL)
Attest:

EDWARD M. FLETCHER, JR.
Attesting Officer

ROBERT GOTTSCHALK
Commissioner of Patents